United States Patent [19]
Hayduk et al.

[11] Patent Number: 5,870,452
[45] Date of Patent: Feb. 9, 1999

[54] SYSTEM AND METHOD FOR CONTROLLING MESSAGE LOOPING BETWEEN NETWORK ELEMENTS

[75] Inventors: John D. Hayduk, Holmdel; Patricia Huang; Lawrence Chien, both of Somerset; Alexander Jodidio, Edison; Carla A. Wood, Flemington; Debbie Edwards, Basking Ridge, all of N.J.

[73] Assignee: Bell Communications Research, Inc., Morristown, N.J.

[21] Appl. No.: 825,580

[22] Filed: Mar. 31, 1997

[51] Int. Cl.⁶ .............................. H04M 1/24; H04M 7/00; G06F 15/16
[52] U.S. Cl. ................................. 379/32; 379/18; 379/13; 379/220; 379/229; 395/200.54; 370/254
[58] Field of Search .............................. 379/1, 9, 10, 14, 379/15, 32, 34, 18, 210, 211, 213, 219, 220, 221, 229, 230; 370/254, 250, 216; 395/200.54, 200.56, 200.6, 200.65

[56] References Cited

U.S. PATENT DOCUMENTS 5,400,333  3/1995  Perlman ................................. 370/254
5,717,750  2/1998  Adams, Jr. et al. ........................ 379/9
5,754,790  5/1998  France et al. ......................... 395/200.6

Primary Examiner—Paul Loomis
Attorney, Agent, or Firm—Joseph Giordano; David A. Hey; Loria B. Yeadon

[57] ABSTRACT

In the proposed Local Number Portability (LNP) telecommunications network, the traditional link between the first six digits of a ten-digit dialed number and the geographic link of a switch is broken. Some pre-LNP telephone services, however, have been implemented based on this geographic link. For the services to continue to work in an LNP environment, network databases must be simultaneously updated with information reflecting the fact that subscribers have switched from one local service provider to another. If these databases are not simultaneously updated, the possibility for looping messages between network elements arises. The present invention provides a method and system for controlling looping messages between network elements wherein a unique code for each incoming message is generated and stored along with the time the message was received. The codes for subsequently received messages are checked against the table entries to determine if the message has been previously received and, if so, how much time has passed since the message was first received. If this time is less than a threshold, the message is assumed to be looping.

22 Claims, 5 Drawing Sheets

SYSTEM AND METHOD FOR CONTROLLING MESSAGE LOOPING BETWEEN NETWORK ELEMENTS

BACKGROUND OF THE INVENTION

The present invention relates generally to local number portability (LNP) in a telecommunications network, and more particularly to controlling looping of messages in an LNP enabled network.

Currently, local phone service is provided by a single company, such as a Regional Bell Operating Company (RBOC). These companies basically enjoy a monopoly over local phone service within their regions. Thus, efforts are being made to introduce competition into the local phone market to eliminate the monopolies and relieve the need to regulate the industry. Under the current system, however, if customers want to change from one service provider to another, they must also change their phone numbers. This is a serious deterrent to switching service providers and, thus, a hindrance to free and open competition.

To alleviate the problem, the FCC has issued an order for LNP which, in addition to providing other features, will allow a customer to switch between local service providers while keeping the same phone number.

In the existing pre-LNP telephone network, the first six digits (NPA-NXX) of a 10 digit phone number identify a particular switch in a particular geographic region. Switches can route calls between switches based on the NPA-NXX of the dialed number. In an LNP environment, however, this relationship between the NPA-NXX and the physical location of a switch is broken, such that there is no fixed relationship between a dialed number and its geographic location. Many existing telephone services such as calling card services, automatic callback, and services relating to voice mail and voice messaging, however, have been implemented based on this geographic relationship. If the change to an LNP environment is to succeed, existing services (i.e., pre-LNP services) must continue to work in the new LNP environment.

Implementation of LNP is creating new network problems. The call flow diagram of FIG. 1 helps illustrate one of these problems. Take, for example, the *69 call back service where two competing local networks A and B exist in a single geographic region. Suppose a caller 10 in Network A dials *69, and the last person that called caller 10 is a subscriber who has switched from the Network A provider to Network B provider. Ideally, both networks are simultaneously updated with the information that the subscriber has ported and call processing proceeds as shown in FIG. 1. A Service Switching Point (SSP) 12 determines that the call is invoking the *69 call back service which requires assistance from an Integrated Service Control Point (ISCP) 16. SSP 12 launches a message to a Signaling Transfer Point (STP) 14, which directs the message to the appropriate ISCP 16. ISCP 16 determines the Signaling Point Code (SPC) (i.e., the address of a network element) of the appropriate ISCP 17 or STP 18 in Network B and routes the message accordingly. ISCP 17 of Network B checks its database (not shown) and routes the requested information to Network B's SSP 19, which completes the call.

If, as assumed above, each network is updated simultaneously, no problems arise. Under the current LNP requirements, however, the network databases may not be updated simultaneously. Suppose in the previous example that Network A updates its database before Network B. The resulting call processing is shown in FIG. 2. A caller 20 again dials *69, and an SSP 22 determines that the call requires assistance from ISCP 26. The SSP 22 launches a message to the STP 24, which directs the message to the appropriate ISCP 26. The ISCP 26 determines the SPC of the appropriate ISCP 27 or STP 28 in Network B and routes the message accordingly. The database (not shown) associated with ISCP 27 in Network B, however, has not been updated to reflect the fact that the subscriber has ported from Network A to Network B. Thus, when ISCP 27 of Network B checks its database, it determines that the subscriber is still with Network A. ISCP 27 then returns the message to STP 24 of Network A. There, the process begins again. The message will loop back and forth between the networks because the databases have not yet been properly updated.

The looping message will stay in the network until Network B updates its database and the message gets correctly routed or the message is dropped. If the message looping problem is serious, because of extremely high volume or multiple looping messages, the ISCP overload mechanism will automatically detect the overload condition and take the necessary steps to drop messages.

During the interim, however, the looping message consumes network capacity. Assuming it takes approximately 200 ms for a message to reach Network B's ISCP from Network A's ISCP, the round-trip will take 400 ms. This results in the loss of about 3 q/s of capacity for each looping message. For simplicity, the above explanation assumes that only two networks are involved. The drain on capacity would be even more significant if intermediate networks are included in the calculation.

Currently, no mechanism exists that would allow the ISCP to detect looping messages. There is, therefore, a need for a system and method to detect and eliminate looping messages before an overload condition is detected by the ISCP.

SUMMARY OF THE INVENTION

To achieve these and other advantages and in accordance with the purposes of the invention, as embodied and broadly described, a method consistent with the present invention includes the steps of receiving a message, generating a code to uniquely identify the message, determining if the code matches one of previously stored codes, and, if the code matches one of previously stored codes, comparing the time the message was received to a time associated with the previously stored code to determine if the difference is less than a predetermined interval.

A system consistent with this invention includes a node for receiving a message, a code generator to generate a code uniquely identifying the message, a device for determining if the code matches one of previously stored codes, and a comparator for comparing the time the message was received to a time associated with the previously stored code to determine if the difference is less than a predetermined interval.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

DETAILED DESCRIPTION

Reference will now be made in detail to the construction and operation of preferred implementations of the present invention which are illustrated in the accompanying drawings.

The following description of the preferred implementations of the present invention is only exemplary of the invention. The present invention is not limited to these implementations, but may be realized by other implementations.

Consistent with the present invention, the ISMS database (not shown) of each ISCP in the network is enhanced with two additional parameters: 1) a monitor interval, preferably ranging from 1 to 30 seconds; and 2) a looping indicator, preferably taking on values 0, 1, or 2. Briefly, time differences between received messages are compared against the monitor interval to determine if they are looping. The looping indicator determines whether the ISCP looping detection algorithm is activated and, if so, what action the ISCP takes upon detecting a looping message. Both parameters are configurable from a network maintenance and operations console (MOC) (not shown).

Figure 1:
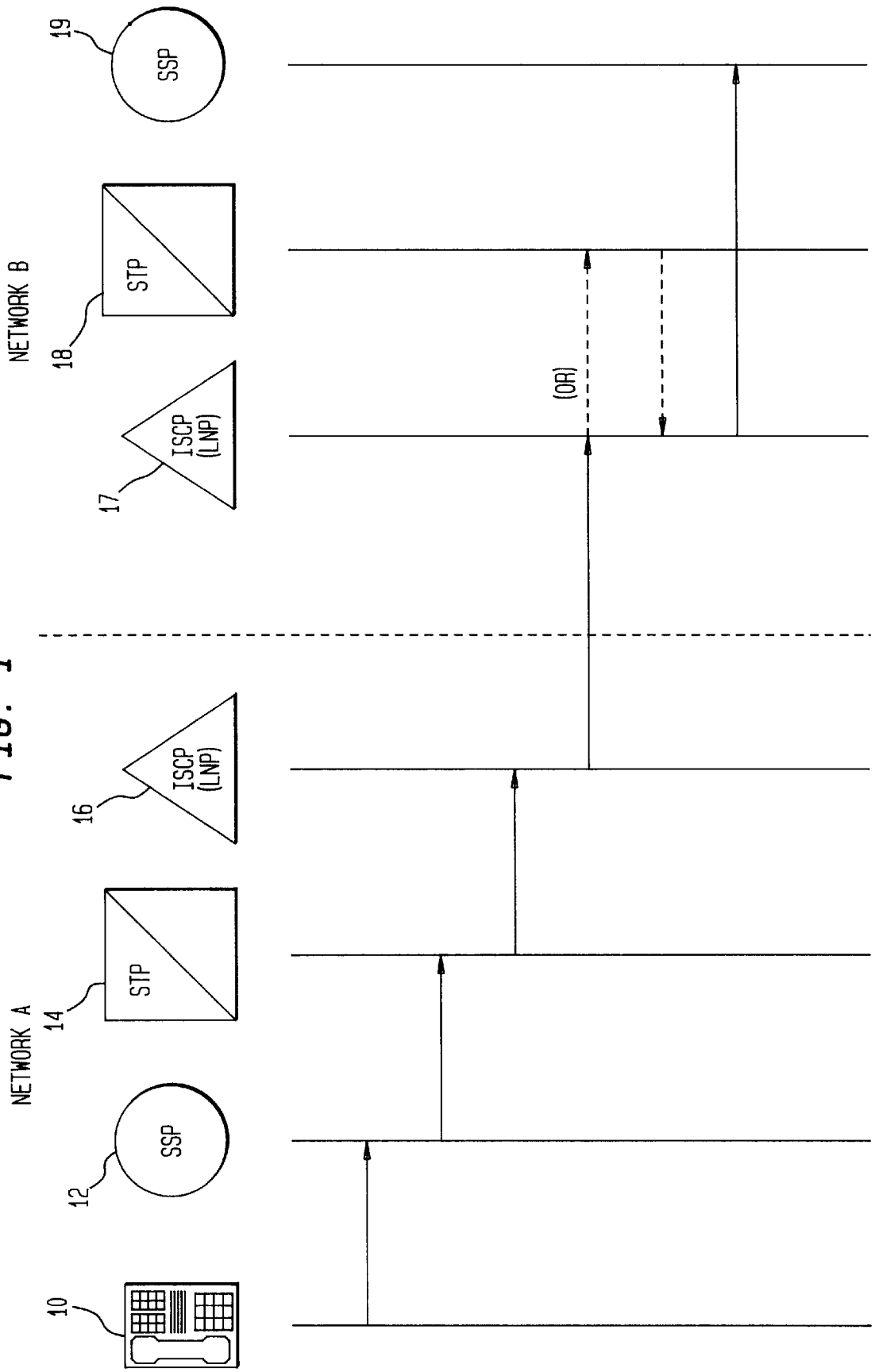
FIG. 1 is a diagram showing ideal call processing in an LNP environment.
Figure 2:
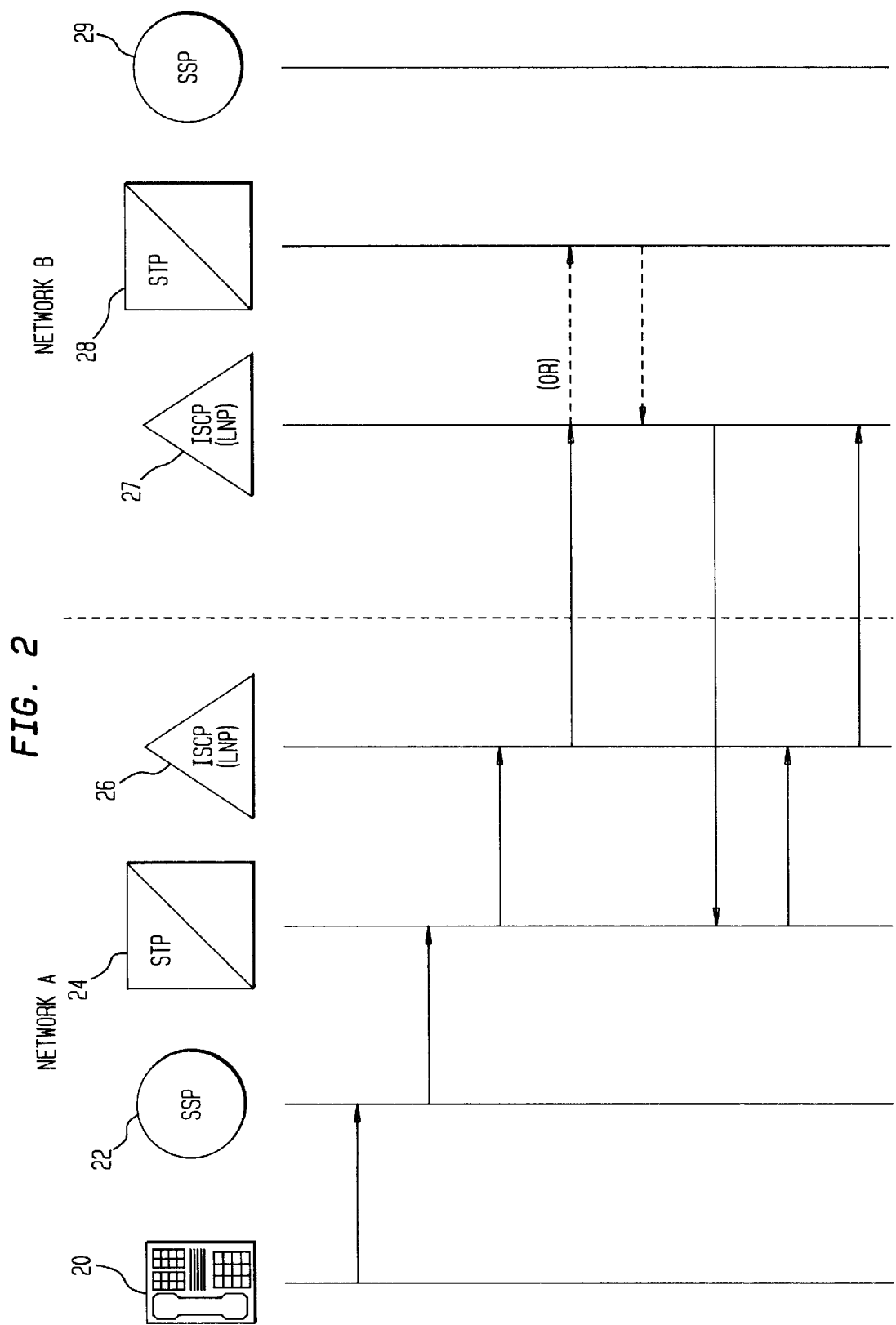
FIG. 2 is a diagram showing a looping message in a LNP environment.
Figure 3:
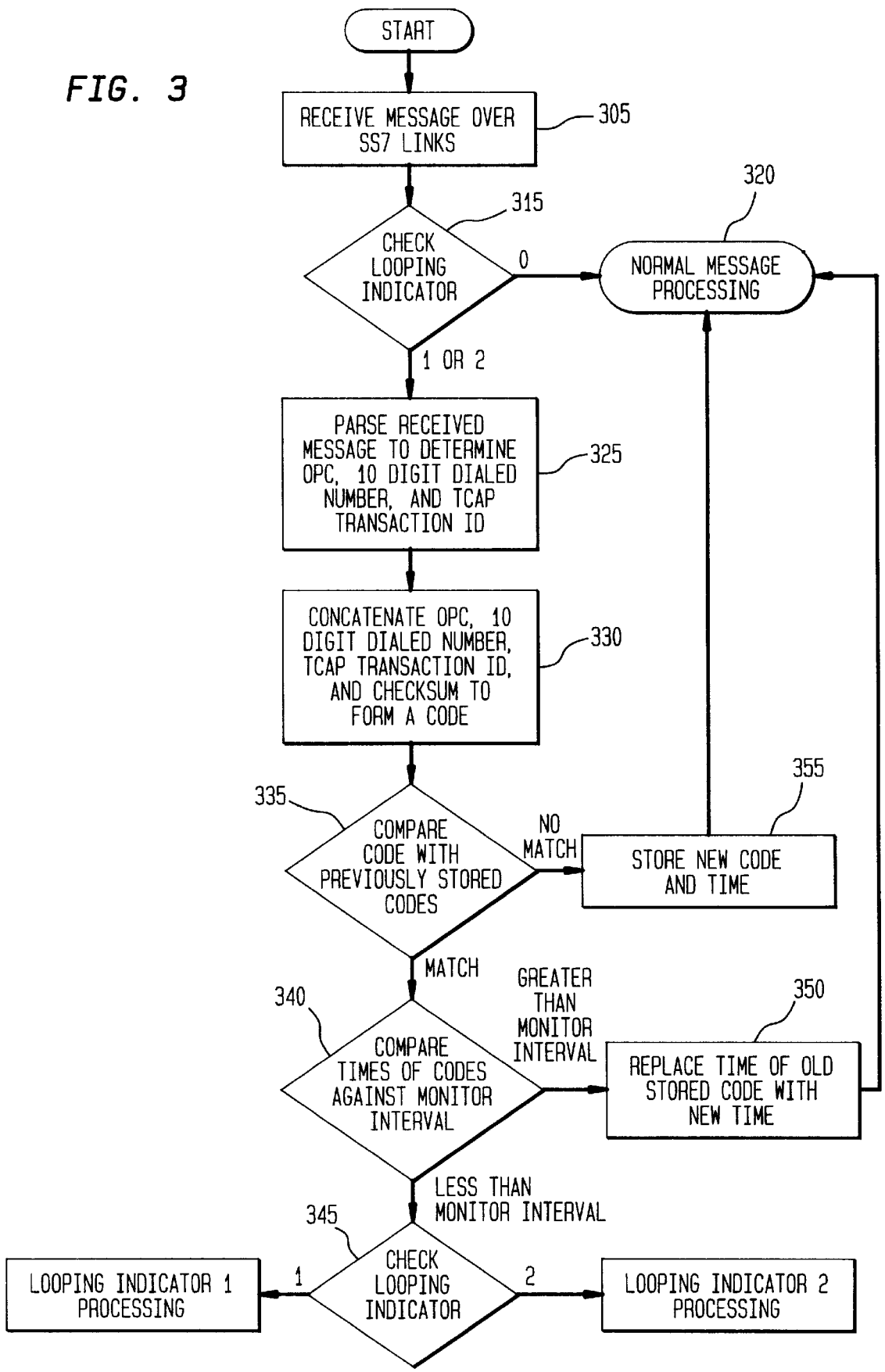
FIG. 3 is a flow chart of a method for detecting looping in an LNP environment in accordance with an embodiment of the present invention.
Figure 6:
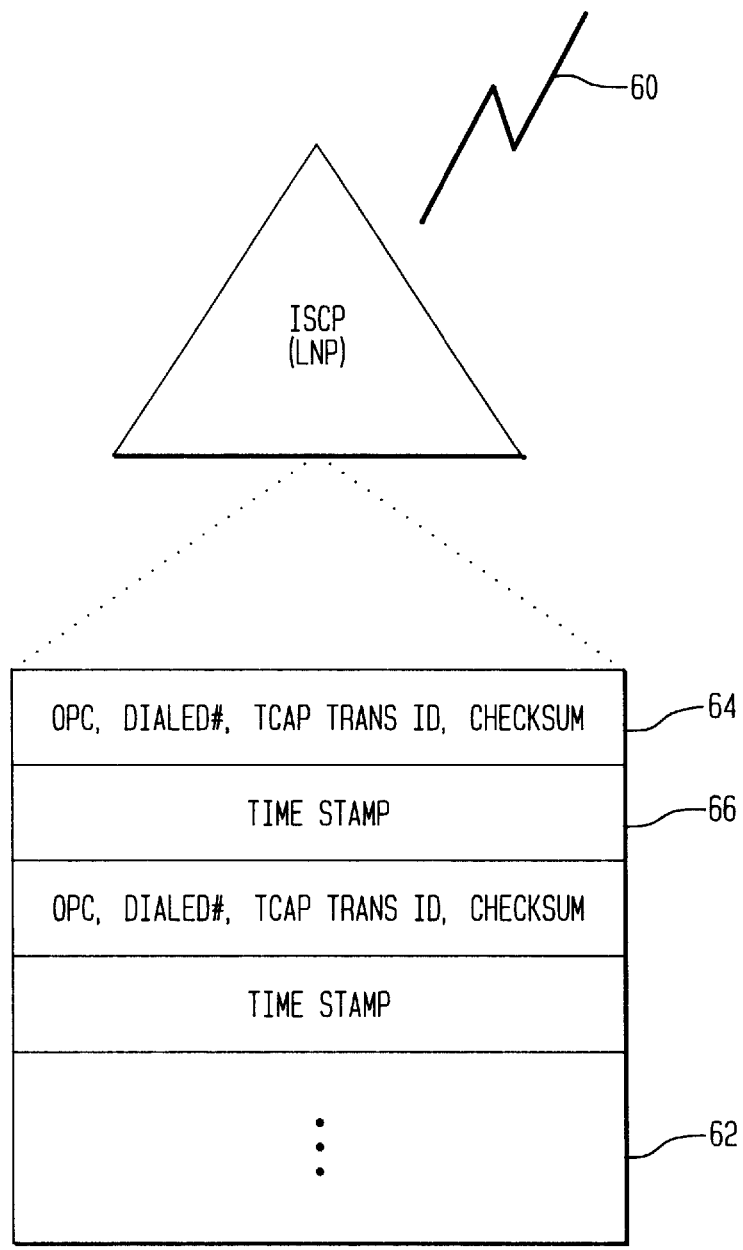
FIG. 6 is a diagram of a system for detecting looping in accordance with an embodiment of the present invention.

ISCP message processing consistent with the present invention is shown in FIG. 3, and the overall system is shown in FIG. 6. The ISCP receives a message from an STP over SS7 links 60 (step 305). The ISCP checks the looping indicator in its database (step 315). If the looping indicator is set to 0, looping detection is turned off. Therefore, the ISCP processes the message normally (step 320).

If the looping indicator is set to 1 or 2, the ISCP parses the received message to determine the Originating Point Code (OPC) (i.e., the address of the network element originating the message), 10 digit dialed number, and transaction capability application part (TCAP) transaction ID (step 325). The ISCP concatenates these values and a checksum computed for the TCAP portion of the received message to form a unique code 64 for the received message (step 330). The ISCP then compares the code with codes that have been previously stored in table 62 (step 335).

If a match is found, the ISCP compares the time the message was received with a time stamp 66 associated with the stored code (step 340). The stored time stamp 66 represents the time the stored code was received. If the difference between the stored time and the time the current message was received is less than the monitor interval, the ISCP assumes the message is looping. In this case, a network has launched a message and received a message having the same unique code in a short time, indicating that it is highly likely the same message.

Figure 4:
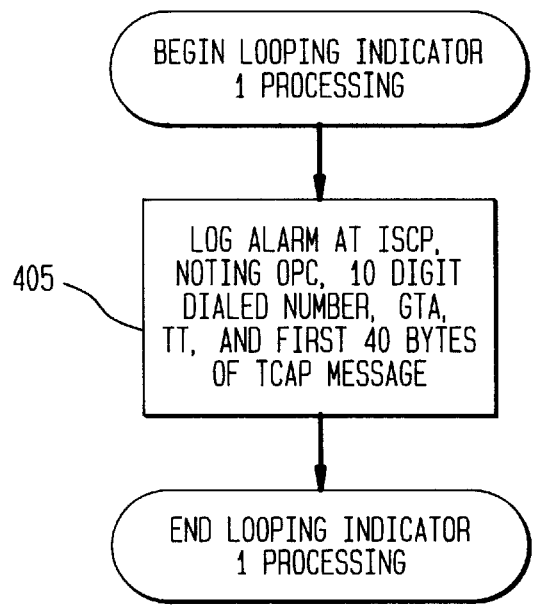
FIG. 4 is a flow chart showing ISCP processing according to one value of a looping indicator stored in the ISCP database in accordance with an embodiment of the present invention.

When the ISCP detects a looping message, it again checks the looping indicator to determine the next step (step 345). As shown in FIG. 4, if the looping indicator is set to 1, the ISCP logs an alarm, preferably noting the following information from the looping message: the OPC, 10 digit dialed number, Global Title Address (GTA), incoming Translation Type (TT), and the first 40 bytes of the TCAP message in hex format (step 405). The alarm is generated for up to 10 looping messages per 5 minute interval.

Figure 5:
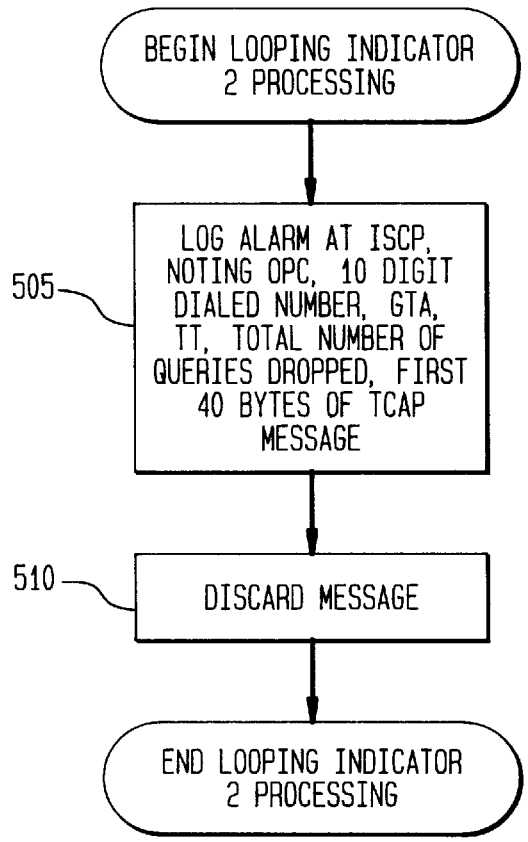
FIG. 5 is a flow chart showing ISCP processing according to another value of a looping indicator stored in the ISCP database in accordance with an embodiment of the present invention.

As shown in FIG. 5, if the looping indicator is set to 2, the ISCP logs an alarm, preferably noting the following information from the looping message: the OPC, 10 digit dialed number, the GTA, incoming TT, total number of messages dropped, and the first 40 bytes of the TCAP message in hex format (step 505). Once this information is logged at the ISCP, the message is discarded (step 510). The alarm is generated for up to 10 looping messages per 5 minute interval.

Returning to the processing at step 340 in FIG. 3, if the difference between the stored time and the time the message was received is greater than or equal to the monitor interval, the ISCP assumes the message is not a looping message but is, instead, a new message. In this case, table 62 is updated with the new message information. Since there is already an entry in table 62 matching the code of the received message, only the time stamp associated with that matching entry need be updated. Thus, the ISCP replaces time stamp 66 associated with the previously stored code with the time the current message was received (step 350). Normal message processing then continues (step 320).

If in step 335, no match is found between the code and the previously stored codes, this indicates that the ISCP has not previously processed this message. Thus, the code and the time the message was received are added to table 62 (step 355). Message processing then proceeds normally (step 320).

Based on current tests, a message will be processed, on average, 4 to 6 times before being detected. When the STP is load sharing messages between mated pairs by directing one set of NPA-NXX's to one ISCP, and the rest of the NPA-NXX's to another ISCP, the looping message could be processed up to 12 times before being detected. These more extreme situations could be accounted for by increasing the monitor interval.

Preferably, the table generated by the ISCP is twice the size necessary to accommodate the ISCP operating at full load. Thus, at full load, only half of the entries in the table will be valid. That is, only half the entries will have time stamps within the monitor interval from the current time. The other entries will represent older messages received more than the monitor interval before the current time. In step 335, when a code does not match a previously stored code, one of these older entries is overwritten with the new code and time stamp (step 355).

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims and their equivalents.

We claim:

1. A method for detecting message looping between network elements comprising the steps of:

receiving a message;

generating a code to uniquely identify the message;

determining if the code matches one of previously stored codes; and if the code matches one of previously stored codes, comparing the time the message was received to a time associated with the previously stored code to determine if the difference is less than a predetermined interval.

2. The method of claim 1 further including the step of:

if the difference between the stored time and the time the message was received is less than the predetermined interval, generating an alarm.

3. The method of claim 1 further including the step of:

checking a looping indicator.

4. The method of claim 3 further including the step of:

performing normal message processing without looping detection if the looping indicator has a first predetermined value.

5. The method of claim 3 further including the step of:

if the difference between the stored time and the time the message was received is less than the predetermined interval, generating an alarm.

6. The method of claim 5 wherein the alarm generating step includes the steps of:

logging a major alarm at an ISCP if the looping indicator has a second predetermined value; and providing the ISCP with an Originating Point Code (OPC), ten digit dialed number, Global Title Address (GTA), incoming Translation Type (TT), and the first 40 bytes of a Transaction Capability Application Part (TCAP) message if the looping indicator has the second predetermined value.

7. The method of claim 5 wherein the alarm generating step includes the steps of:

if the looping indicator has a third predetermined value, logging a minor alarm at an ISCP; and providing the ISCP with at least one of an OPC, ten digit dialed number, GTA, incoming TT, total number of messages dropped, and the first 40 bytes of a TCAP message.

8. The method of claim 7 further including the step of:

discarding the message.

9. The method of claim 1 further including the step of:

if the difference between the time said message was received and the time associated with the previously stored code is greater than or equal to the predetermined interval, replacing the time associated with the previously stored matched code with the time said message was received.

10. The method of claim 1 further including the step of:

if the code does not match one of previously stored codes, storing the code and the time the message was received.

11. The method of claim 10 wherein the storing step includes the step of:

storing the code and the time the message was received in a table.

12. The method of claim 10 wherein the storing step includes the step of:

overwriting a previously stored entry whose stored time is more than the predetermined interval before the current time.

13. The method of claim 1 wherein the step of generating a code includes the steps of:

extracting an originating point code (OPC) from the message;

extracting a ten digit dialed number from the message;

extracting a TCAP transaction identification from the message;

computing a checksum for the TCAP portion of the received message; and concatenating the OPC, ten digit dialed number, TCAP transaction identification, and checksum to form the code.

14. The method of claim 1 wherein the comparing step includes the step of:

comparing the time the message was received to a time associated with the previously stored code to determine if the difference is less than a predetermined interval ranging from one to thirty seconds.

15. A system for detecting message looping between network elements comprising:

a node for receiving a message;

a code generator to generate a code uniquely identifying the message;

means for determining if the code matches one of previously stored codes; and means for comparing the time the message was received to a time associated with the previously stored code to determine if the difference is less than a predetermined interval.

16. The system of claim 15 further including:

means for generating an alarm if the difference between the stored time and the time the message was received is less than the predetermined interval.

17. The system of claim 15 further including:

means for replacing the time associated with the previously stored matched code with the time said message was received if the difference between the time said message was received and the time associated with the previously stored matched code is greater than or equal to the predetermined interval.

18. The system of claim 15 further including:

means for storing the code and the time the message was received if the code does not match one of previously stored codes.

19. The system of claim 18 wherein the storing means includes:

a table for storing the code and the time the message was received.

20. The system of claim 18 wherein the storing means includes:

means for overwriting a previously stored entry whose stored time is more than the predetermined interval before the current time.

21. The system of claim 18 wherein the code generator includes:

means for extracting an originating point code (OPC) from the message;

means for extracting a ten digit dialed number from the message;

means for extracting a TCAP transaction identification from the message; and means for concatenating the OPC, ten digit dialed number, and TCAP transaction identification to form the code.

22. The system of claim 15 wherein the comparing means includes:

means for comparing the time the message was received to a time associated with the previously stored code to determine if the difference is less than a predetermined interval ranging from one to thirty seconds.

* * * * *